United States Patent [19]

Fox et al.

[11] 3,926,949
[45] Dec. 16, 1975

[54] CYTOKININ-3-NUCLEOSIDE COMPOUNDS

[75] Inventors: J. Eugene Fox; James D. McChesney, both of Lawrence, Kans.

[73] Assignee: Kansas University Endowment Association, Lawrence, Kans.

[22] Filed: Sept. 9, 1974

[21] Appl. No.: 504,267

[52] U.S. Cl. ............................... 260/211.5 R; 71/88
[51] Int. Cl.[2] .......................................... C07H 19/16
[58] Field of Search ............................. 260/211.5 R

[56] References Cited
UNITED STATES PATENTS 3,535,207  10/1970  Shiro et al. .................... 260/211.5 R
3,627,753  12/1971  Posternak et al. .............. 260/211.5 R

OTHER PUBLICATIONS

Darnall et al., "Chem. Abst." Vol. 66, 1967, p. 76,263w.

Primary Examiner—Johnnie R. Brown
Attorney, Agent, or Firm—Charles N. Blitzer

[57] ABSTRACT

There is provided, plant growth regulators of the cytokinin-3-nucleoside type having the following formula:

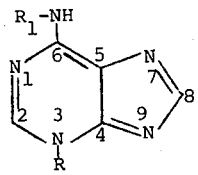

wherein $R_1$ represents a member selected from the group consisting of an alkyl group of from one to eight carbon atoms, a branched alkyl group of from one to eight carbon atoms, an alkenyl group of from one to eight carbon atoms, a $R_3$—CO— group, wherein $R_3$ represents a member selected from the group consisting of an alkyl group of from one to eight carbon atoms, a branched alkyl group of from one to eight carbon atoms, an alkenyl group of from one to eight carbon atoms, and an aryl group, a —$CH_2$—$C_6H_5$ group, a —$C_2H_4$—$C_6H_5$ group, and a —$CH_2$—Y group, wherein Y represents a member selected from the group consisting of a heterocyclic group, a cycloalkyl group, and a cycloalkenyl group, and a —$CH_2$—$C_6H_4$—X group, wherein X represents a member selected from the group consisting of an alkyl group of from one to three carbon atoms, a branched alkyl group of from one to three carbon atoms, an alkenyl group of from one to three carbon atoms, a branched alkenyl group of from one to three carbon atoms, a halogen atom, and a $CF_3$ group; and wherein R represents a simple sugar.

These cytokinin-3-nucleoside compounds exhibit plant growth regulant activity. The compounds are characterized as being more soluble and more biologically active over the corresponding cytokinin-9-nucleoside derivatives.

10 Claims, No Drawings

CYTOKININ-3-NUCLEOSIDE COMPOUNDS

BACKGROUND OF THE INVENTION

1. Field of the Invention

The present invention is directed to cytokinin-nucleoside compounds which exhibit plant growth regulating activity, and more particularly, the present invention is directed to certain novel cytokinin-nucleoside compounds of the 3-substituted type.

2. Description of the Prior Art

Cytokinin-nucleoside compounds such as the cytokinin-9-nucleosides are well known in the art. While attempts have been made to utilize the cytokinin-9-nucleosides as plant growth regulators, little, if any success, has been achieved. The reason for this resides in the nonpolar character of the compounds and the fact that they do not permit movement of the free base. As such, transportation of the cytokinin-active moiety into plant cells via their roots is inhibited. Attempts have been made to overcome these deficiencies, for instance, by employing certain 9-tetrahydrophyranyl derivatives. However, the latter compounds suffer from certain disadvantages among which are (1) being 9-substituted purines, they antagonize the natural components of RNA and DNA and thus constitute a health hazard, and (2) cytokinin activity is greatly reduced because the 9-substituent is relatively stable to enzymatic cleavage and thus interferes with the biological activity of the compound in situ.

SUMMARY OF THE INVENTION

It is, therefore, one object of the present invention to provide novel cytokinin-3-nucleoside compounds exhibiting growth regulatory activity in plants.

Still, it is another object of the present invention to provide novel cytokinin-3-nucleoside compounds which exhibit enhanced water solubility so as to enable such compounds to penetrate through plant cell walls whereby their growth regulatory activity can be initiated.

Finally, it is a third object of the present invention to provide novel cytokinin-3-nucleoside compounds which are not only highly water soluble, but "cleave" following entrance into the plant cell wall so as to release the cytokinin-active moiety, that moiety which is responsible for plant growth regulatory activity.

Accordingly, all the foregoing objects are attained with certain cytokinin-3-nucleoside compounds having the formula:

wherein $R_1$ represents a member selected from the group consisting of an alkyl group of from one to eight carbon atoms, a branched alkyl group of from one to eight carbon atoms, an alkenyl group of from one to eight carbon atoms, a $R_3$—CO— group, wherein $R_3$ represents a member selected from the group consisting of an alkyl group of from one to eight carbon atoms, a branched alkyl group of from one to eight atoms, an alkenyl group of from one to eight carbon atoms, and an aryl group, a —$CH_2$—$C_6H_5$ group, a —$C_2H_4$—$C_6H_5$ group, and a —$CH_2$—Y group, wherein Y represents a member selected from the group consisting of a heterocyclic group, a cycloalkyl group, and a cycloalkenyl group, and a —$CH_2$—$C_6H_4$—X group, wherein X represents a member selected from the group consisting of an alkyl group of from one to three carbon atoms, a branched alkyl group of from one to three carbon atoms, an alkenyl group of from one to three carbon atoms, a branched alkenyl group of from one to three carbon atoms, a halogen atom, and a $CF_3$ group; and wherein R represents a simple sugar.

DETAILED DESCRIPTION OF THE INVENTION

While all the compounds encompassed within the above-generic formula will satisfy the objectives of the instant application, nevertheless, certain preferred embodiments are noteworthy as set forth below.

With respect to the definition of $R_1$, while alkyl, branched alkyl, and alkenyl groups of from one to eight carbon atoms are operative for the purpose of this invention, those having a carbon range of from five to eight carbon atoms are preferred. In addition, any one of the alkyl, branched alkyl, or alkenyl groups can be further substituted with a member selected from the group consisting of a hydroxyl group and a halogen atom.

Similarly, with respect to the situation in which $R_1$ represents a —$CH_2$—$C_6H_5$ group or a —$C_2H_4$—$C_6H_5$ group, the phenyl moiety of either one of these groups can be substituted with an alkyl group of from one to eight carbon atoms, a halogen atom, a nitro group, a hydroxy group, or a $CF_3$ group. Furthermore, when an alkyl group of from one to eight carbon atoms is employed in this situation, the methyl group is most preferred.

Finally, in defining $R_1$, when $R_1$ represents a —$CH_2$—Y group, wherein Y represents a member selected from the group consisting of a heterocyclic group, a cycloalkyl group, or a cycloalkenyl group, the following specie groups are preferred. For the heterocyclic situation, a member selected from the group consisting of a furfuryl group, a pyridyl group, and a thiophene group are preferred. In the situation where Y is a cycloalkyl group, a cyclopentyl group, a cyclohexyl group, and a cycloheptyl group are preferred. Similarly, in the situation where Y represents a cycloalkenyl group, a cyclopentenyl group, a cyclohexenyl group, and a cycloheptenyl group are preferred.

In further defining the situation wherein Y represents a heterocyclic group, it must be noted that substituents can be placed on the heterocyclic moiety, said substituents being selected from the group consisting of a halogen atom, a hydroxy group, and a nitro group.

Turning to the definition for the substituent R, as indicated earlier, R can represent any simple sugar, such as for instance, ribose, mannose, galactose, fructose, glucose (including both glucofuranose and glucopyranose), xylose, and the like. However, of all the simple sugars operative for the purpose of this invention, those of glucofuranose, glucopyranose, and xylose have provided the most superior results.

At this juncture, it should be specifically noted that the uniqueness of the compounds of this invention (extreme solubility and "cleavage" to release the cytokinin-moiety) is due to the placement of the simple sugar moiety at the 3-position of the cytokinin-nucleoside structure.

Among all the compounds encompassed within the above-described generic formula, the three compounds set out below have shown exceptional plant growth regulant activity:

1. 6-benzylamino-3-β-D-glucopyranosyl purine (N⁶-benzyl-3-β-D-glucopyranosyl adenine)
2. 6-benzyl-3-β-D-xylopyranosyl purine (N⁶-benzyl-3-β-D-xylopyranosyl adenine)
3. 6-benzylamino-3-β-D-galactopyranosyl purine (N⁶-benzyl-3-β-D-galactopyranosyl adenine)

All the compounds encompassed within the above-identified generic formula can be prepared by a simple step-wise procedure as outlined below:

Initially, a compound of the formula:

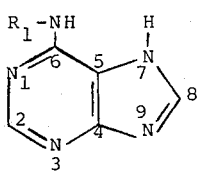

wherein $R_1$ is defined as above is reacted with a mercuric halide in the presence of sodium hydroxide to obtain the corresponding halomercuri-salt (Cl, Br, I). Subsequently, this salt is then reacted with the appropriate acetylated simple sugar halide (Cl, Br, I) in the presence of xylene for a period of one-third to 2 hours, at a temperature of 100°C, thus obtaining the acetylated intermediate. Finally, the acetylated intermediate is then reacted with methyl alcohol in the presence of a 10% ammonium hydroxide solution at 25° C for a period of time approximating 24 hours to thus obtain the corresponding cytokinin-3,7, and 9-nucleosides. The cytokinin-3-nucleoside material is isolated via conventional chromatography on a silica gel. If necessary, the final compound can be purified by conventional means such as recrystallization in a suitable organic solvent.

The compounds of the present invention are suitably administered by dissolving the same in water and administering the aqueous cytokinin-3-nucleoside solution to plants by any conventional, acceptable, horticultural means and in an effective therapeutic amount. For example, an aqueous solution of the compound can be directly administered to a plant by introducing the solution into the plant's circulatory system directly (intravenous route).

Normally, while the dosage range for the compounds of this invention will vary, depending upon the plant employed and the need of the plant, as a basic guideline, in amount of from 0.1 mcg./g of plant weight to 0.1 mg./g of plant weight will suffice.

Without further elaboration, it is believed that one of ordinary skill in the art can, using the preceding description, utilize the present invention to its fullest extent. The following preferred specific embodiments are, therefore, to be construed as merely illustrative, and not limitative of the remainder of the speicification and claims in any way whatsoever. Unless otherwise indicated, all reference to temperatures denotes Centigrade.

EXAMPLE I

PREPARATION OF 6-BENZYLAMINO-3-β-D-GLUCOPYRANOSYL PURINE

The procedure for the synthesis of this compound is that described earlier in the present application, which procedure was disclosed by Davoll, J. and Lowry, B. A., Journal American Chemical Society, Volume 73, 1650–1655 (1951). The particular synthesis described in this example is an adaption of that procedure.

To a suspension of 6.89 g (0.015 mols) of the chloromercuri salt of N⁶-benzyl-adenine in xylene, there was added 12.33 g (0.03 mols) of 2,3,4,6-tetra-O-acetyl-α-glucopyranosyl bromide, and this mixture was then heated to reflux for 20 minutes in a reaction flask. The suspension dissolved and a syrupy precipitate appeared on the sides and bottom of the reaction flask. The xylene was removed in vacuo and the residue was dissolved in methanol and adjusted to 1.5 N with concentrated ammonium hydroxide. The copious precipitate which formed, (inorganic salts of mercury) was removed via centrifugation. The clear supernatant liquid which contained the cytokinin-3,7, and 9-nucleoside isomers was reduced in vacuo to a brown-syrupy residue, and this residue was further purified by chromatography means on silica gel (extra pure) using water as the eluent to yield 3.0 g (50%) of 6-benzylamino-3-β-D-glucopyranosyl purine.

EXAMPLE II

PREPARATION OF 6-BENZYLAMINO-3-β-D-XYLOPYRANOSYL PURINE

The procedure employed to prepare this particular compound was identical to the procedure employed to prepare the compound of Example I with the exception of the following: 0.92 g (0.002 mols) of the chloromercuri salt of N⁶-benzyl adenine and 1.0 g (0.0025 mols) of 2,3,5-tri-O-acetyl-α-xylopyranosyl bromide replaced the adenine and glucopyranosyl bromide compounds initially employed. This procedure yielded 0.400 g (50%) of the final compound, 6-benzylamino-3-β-D-xylopyranosyl purine.

EXAMPLE III

PREPARATION OF 6-BENZYLAMINO-3-β-D-GALACTOPYRANOSYL PURINE

The procedure employed to prepare this compound was identical to that employed to prepare the compound of Example I with the exception that 2,3,5,6-tetra-O-acetyl-α-galactopyranosyl bromide replaced the glucopyranosyl compound employed. The procedure yielded 3.0 g (50%) of 6-benzylamino-3-β-D-galactopyranosyl purine.

The preceding examples can be replaced with similar success by merely substituting the generically or specifically described reactants and/or operating conditions of this invention for those used in the preceding examples.

ENZYMATIC STABILITY STUDIES
6-BENZYLAMINO-3-β-D-GLUCOPYRANOSYL PURINE

To a reaction mixture containing β-glucosidase derived from sweet almonds (5 mg./ml), there was added 6-benzylamino-3-β-D-glucopyranosyl purine, in a concentration of $1.4 \times 10^{-4}$ mols. The reaction mixture was buffered with an aqueous solution of 0.05 mol potassium acetate buffer to achieve a pH of 6.0.

The reaction mixture was then incubated at a temperature of from 28° C to 30° C for a period approximating some 60 minutes, and then, the reaction mixture was quenched with one volume of 95% ethanol and boiled. The supernatant liquid was assayed by the Thin Layer Chromatography method (silica gel G, 9:1 $CHCl_3$: 95% ethanol).

The above stability study clearly indicated that the enzyme, β-glucosidase could hydrolyze the compound tested, thus yielding the free base.

As a control, a parallel reaction mixture was employed with the exception that the β-glucosidase enzyme referred to above was omitted. The control verified the fact that the compound tested was stable under acid conditions, per se.

BIOLOGICAL ACTIVITY STUDIES
6-BENZYLAMINO-3-β-D-GLUCOPYRANOSYL PURINE AND
6-BENZYLAMINO-3-β-D-XYLOPYRANOSYL PURINE

The biological activity of the above-identified compounds was determined by the standard soybean "callus" cytokinin assay as disclosed in the text entitled, "Modern Methods of Plant Analysis," Miller, C. O., Volume VI, 194–202 (Linskens, H. F. and Tracy, M. D., Editors, Springer, Berlin) 1963.

Essentially, when $5.0 \times 10^{-7}$ mols of either compound was administered to a soybean "callus" (tissue culture), the fresh weight (per piece) of the soybean "callus," following 30 days of growth, was 7.5 g, and the dry weight (per piece) was 0.41 g.

Each "callus" was comprised of a basal medium, auxin, and each of the above-identified compounds in its respective amount as set forth above.

As a control, another tissue culture ("callus") was prepared in identical fashion to that set forth above, but in this instance, the above-identified compounds was not introduced. The resultant fresh weight per piece was 0.57 g, and the dry weight per piece was 0.045 g.

The above biological activity studies clearly indicate that the compounds of the instant invention actually stimulate growth activity.

When the above study was repeated, employing $5.0 \times 10^{-7}$ mols of the prior art compound, 6-benzylamino-9-β-D-glucopyranosyl purine, the fresh weight per piece was 0.15 g, and the dry weight per piece was 0.015 g, respectively.

As is apparent, the compounds of this invention are far more biologically active than those compounds of the prior art.

When subjected to the above enzymatic stability and biological activity studies, substantially similar results will be obtained with the remaining compounds of this invention.

As previously indicated, the cytokinin-3-nucleosides of this invention are extremely useful as plant growth regulators for virtually any type of plant. One specific application is the use of these compounds in the effective control of Purple Nut Sedge. The Purple Nut Sedge is a wide spread pest which results in severe crop losses. It is resistant to the usual range of herbicides because the plant possesses a number of dormant tubers which sprout year after year. The cytokinin-3-nucleosides of this invention includes such tubers to sprout all at once whereupon they can be killed with the normal variety of herbicides.

From the foregoing description, one of ordinary skill in the art can easily ascertain the essential characteristics of the instant invention, and without departing from the spirit and scope thereof, can make various changes and modifications of the invention to adapt it to various usages and conditions. As such, these changes and modifications are properly, equitably, and intended to be, within the full range of equivalence of the following claims.

What we claim is:

1. A novel cytokinin-3-nucleoside compound of the formula:

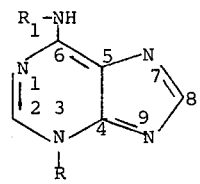

wherein $R_1$ represents a member selected from the group consisting of $-CH_2-C_6H_5$, $-C_2H_4-C_6H_5$, and $-CH_2Y$, wherein Y represents a member selected from the group consisting of furfuryl, pyridyl, thiophene, $C_5-C_7$ cycloalkyl, and $C_5-C_7$ cycloalkenyl, and $-CH_2-C_6H_4-X$, wherein X represents a member selected from the group consisting of alkyl of from one to three carbon atoms, a branched alkyl of three carbon atoms, an alkenyl of from one to three carbon atoms, a branched alkenyl of three carbon atoms, halogen, and $CF_3$; and wherein R represents a monosaccharide.

2. The compound of claim 1, wherein said R represents a member selected from the group consisting of glucofuranose, glucopyranose, galactose, ribose, mannose, fructose, and xylose.

3. The compound of claim 2, wherein said member is a member selected from the group consisting of glucofuranose, glucopyranose, and xylose.

4. The compound of claim 1, wherein $R_1$ is benzyl.

5. The compound of claim 1, wherein R represents glucopyranose.

6. The compound of claim 1, wherein R represents glucofuranose.

7. The compound of claim 1, wherein R represents xylofuranose.

8. The compound of claim 1:
6-Benzylamino-3-β-D-glucopyranosyl purine.

9. The compound of claim 1:
6-Benzylamino-3-β-D-xylopyranosyl purine.

10. The compound of claim 1:
6-Benzylamino-3-β-D-galactopyranosyl purine.

* * * * *